Figure 1:
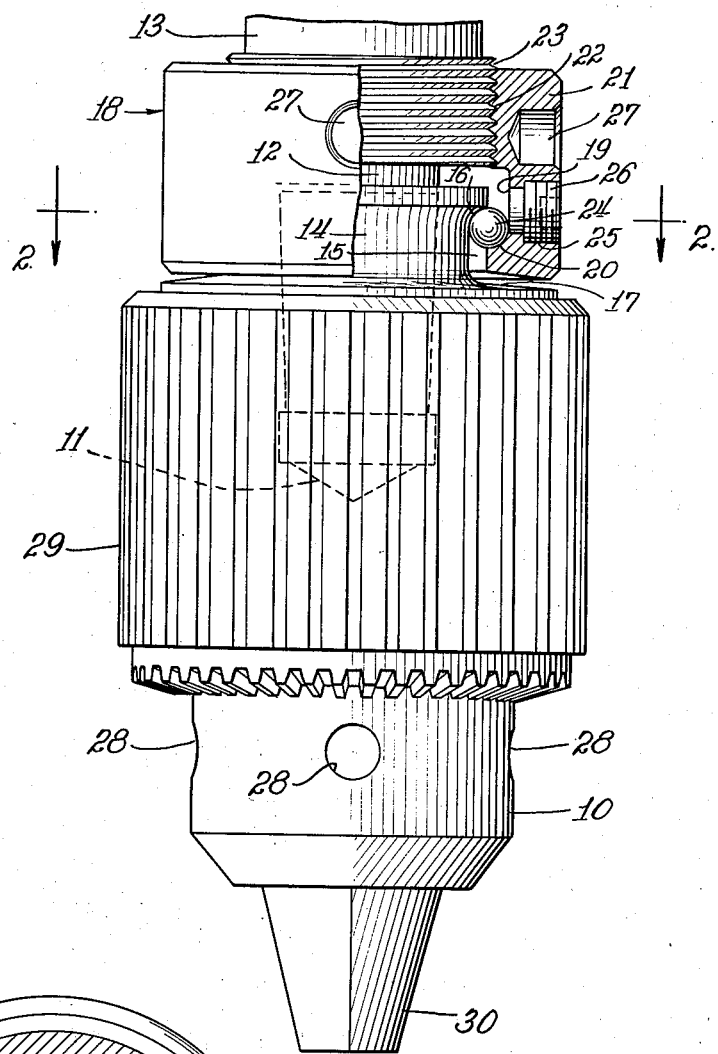

July 7, 1959

E. J. ONDECK 2,893,743

CHUCK WITH BALL LOCKING MEANS

Filed July 27, 1953

INVENTOR.
Elmer J. Ondeck
BY
Watson D Harbaugh
Atty

United States Patent Office 2,893,743
Patented July 7, 1959

2,893,743

CHUCK WITH BALL LOCKING MEANS

Elmer J. Ondeck, Brookfield, Ill., assignor, by mesne assignments, to Supreme Products Corporation, Chicago, Ill., a corporation of Illinois Application July 27, 1953, Serial No. 370,446

4 Claims. (Cl. 279—9)

This invention relates to a safety lock chuck of the type which is used for attaching cutting tools to a rotating spindle.

Various types of chucks have heretofore been provided equipped with safety lock means for preventing the chuck from being disengaged from the rotating spindle. A safety lock means is especially important where the spindle engages and drives the chuck through a tapered end which is received within a tapered socket of the chuck, since the chuck and spindle may tend to separate during cutting operations due to the exertion of side pressure on the tool, vibration of the tool, etc. However, the safety lock means heretofore provided for this type of chuck has not been entirely satisfactory for a number of reasons.

One safety lock means which has previously been proposed for chucks of the character described employs a lock ring rotatably mounted on the upper end of the chuck and equipped internally with threads for engaging external threads on the spindle above its tapered end. The method of mounting such a lock ring has given particular trouble, since it has been desirable to have the lock ring not only rotatable but also axially shiftable with respect to the chuck. Specifically, the use of a C-spring for interlocking the lock ring and the chuck while permitting the desired movement has presented difficulties. Such C-springs are not only expensive both as to original cost and installation, but require the interior of the lock ring to be machined with a double shouldered annular recess which greatly increased the cost of manufacturing the lock ring. Further, a C-spring tends to bind and make the lock ring difficult to rotate as its final locking position is reached in connecting the chuck to the spindle. Moreover, if the C-spring is not completely seated in its retaining recess, that is, where the lock ring has not been turned to its final locking position, there is a danger that the C-spring will open up due to centrifugal force and allow the chuck to separate from the spindle.

It is therefore a general object of this invention to provide a safety lock chuck of improved design, especially in the design of the lock ring, and the means for interconnecting the lock ring to the chuck while permitting the free rotation and axial movement of the ring with respect to the chuck. A more specific object is to provide a safety lock chuck of the character described which does not tend to bind as its final locking position is approached, and which in general provides a freer movement with less friction than previous safety lock chucks. A still further object is to provide interconnecting means between the lock ring and the chuck which are not subject to being displaced by centrifugal force, and which holds the lock ring securely to the chuck body even though the ring has not been tightened to its fullest extent on the spindle. Another object is to provide a safety lock chuck which is cheaper both as to parts and manufacturing costs and is easier to assemble or disassemble than previous safety lock chucks. Further objects and advantages will become apparent as the specification proceeds.

Figure 2:
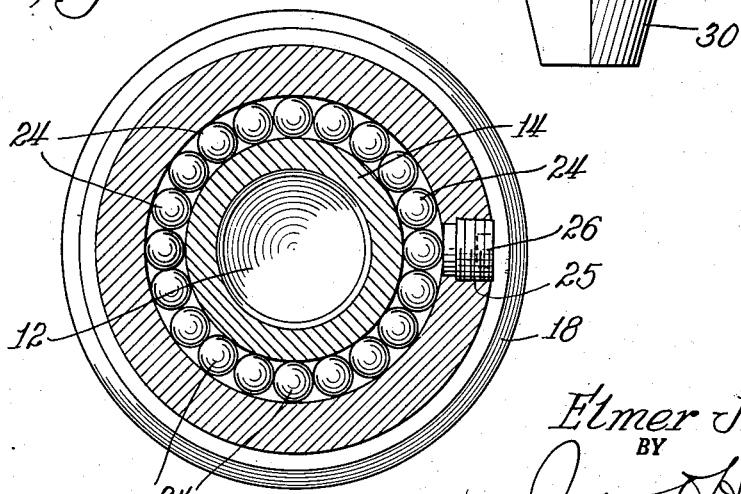

This invention is shown in an illustrative embodiment in the accompanying drawing, in which Fig. 1 is an elevational view of a safety lock chuck constructed in accordance with this invention as it would appear when connected to a driving spindle in its normal operating relationship to the spindle, a lock ring being broken away to show the interior construction of the ring and the means for interconnecting the ring and spindle; and Fig. 2, a sectional plan view taken on plane 2—2 of Fig. 1.

In the illustration given, there is shown a chuck assembly having a chuck body 10 providing a tapered opening 11 in its upper end for receiving a correspondingly tapered end 12 of a spindle 13 to rotate the chuck body.

Preferably as shown, the upper end portion 14 of chuck body 10 is of reduced diameter with an annular channel or recess 15 therearound providing an outwardly-extending shoulder 16 at its upper end. Preferably, chuck body 10 also provides an outwardly-extending shoulder 17 below annular recess 15 of greater outward extent than shoulder 16.

A lock ring 18 is loosely received on reduced end portion 14 about annular recess 15. Lock ring 18 is provided internally with an annular recess 19 aligned with chuck body channel or recess 15. Preferably, lock ring 18 provides an inwardly-extending shoulder 20 at the lower end of recess 19, which shoulder is positionable at a spaced distance below the upper end of chuck channel or recess 15, for example, in the position illustrated in Fig. 1. Lock ring 18 also has a portion 21 projecting above the upper end of chuck body 10 and equipped internally with threads 22 for secure engagement with external threads 23 on spindle 13 above its tapered end 12.

A plurality of balls or ball bearings 24, as seen more clearly in Fig. 2, are received within aligned annular recesses 15 and 19 and retained therein by the upper shoulder 16 or chuck body 10 and lock ring shoulder 20. Lock ring 18 is movable both rotationally and axially on balls 24 between a lower position in contact with lower shoulder 17 of chuck body 10 and an upper position, which is the position illustrated in Fig. 1, with balls 24 in locking engagement with the upper shoulder 16 of the chuck body and the lock ring shoulder 20. The purpose of these two positions is to facilitate the connection and disconnection of the chuck assembly to the driving spindle. More specifically, at the time of attachment of the chuck assembly to the spindle, lock ring 18 will be resting on chuck body shoulder 17. As the tapered end 12 of the spindle is inserted within the tapered socket 11 of the chuck assembly, lock ring 18 will be rotated into threaded engagement with the threaded portion of spindle 13. This will elevate lock ring 18 until the balls 24 are engaged between shoulders 16 and 20. Further rotation of the lock ring 18 will then tend to force the tapered end 12 of the spindle into tight engagement with the walls of socket opening 11 until it has reached its furthest point of entrance into this opening. When this occurs, the balls 24 will be clamped between shoulders 16 and 20 and the chuck assembly will be securely retained on spindle 13.

In disconnecting the chuck assembly from the spindle, the lock ring 18 is rotated in a direction so that it moves downwardly with respect to spindle 13 and until it comes to rest on shoulder 17. From this point on, continued rotation of the lock ring tends to force the chuck body 10 downwardly while the tapered end 12 of the spindle remains stationary, thereby forcing these members to separate. In both the connecting and disconnecting operations it can be seen that balls 24 are admirably suited to permit the parts to move both rotationally and axially with respect to each other, freely and without any tendency to bind.

If desired, a sufficient number of balls 24 can be employed to form a substantially continuous array of balls around the reduced end 14 of the chuck, as illustrated in Fig. 2. However, if desired, a substantially lesser number of balls can be employed. However, it has been found desirable to employ a sufficient number of balls to extend at least half-way around reduced end portion 14 when the balls are in contact with each other. Also, it is preferred, as illustrated in Fig. 1, to have the surfaces of upper shoulder 26 and lock ring shoulder 20 arcuately shaped to conform to the surfaces of balls 24 and thereby define facing races for receiving the balls.

To provide for the insertion and removal of balls 24, an opening 25 is provided through the side wall of lock ring 18, which opening is aligned with lock ring recess 19 and is alignable with chuck body recess 15. A threaded plug 26 or other removable plug member is provided for closing opening 25 to prevent the escape of the balls. In the assembly of the chuck with this construction, lock ring 18 can be slipped over reduced end 14 until it is seated on shoulder 17. With threaded plug 26 removed, a plurality of balls 24 are then introduced into the space provided by recesses 15 and 19. Upon the replacement of plug 26, the members are securely locked together so that they cannot become separated while at the same time lock ring 18 is freely movable both rotationally and axially with respect to reduced end 14.

Preferably, lock ring 18 is provided with some means for applying a turning or rotational force thereto, such as wrench sockets 27. Similarly, the lower end portion of chuck body 10 can be provided with wrench sockets 28 for use in holding the body while applying a turning force to lock ring 18.

According to a construction well known in the art, the chuck assembly is provided with a rotationally-mounted sleeve 29 for the purpose of opening and closing the jaws 30 into which is inserted the cutting tool.

While in the foregoing specification this invention has been described in relation to a preferred embodiment thereof and many specific details have been set forth in describing this embodiment, it will be apparent to those skilled in the art that the invention is capable of being employed in other embodiments and that many of the details set forth herein can be varied widely without departing from the basic concepts of the invention.

I claim:

1. In combination with a spindle having an elongated, tapered end portion of reduced cross section and having also external threads adjacent thereto, a chuck assembly removably secured to said spindle and comprising a chuck body having a tapered opening removably seating said end portion therein, a lock ring having an inwardly threaded annular section releasably engaging the threads of said spindle and having adjacent said inwardly threaded section an internal annular recess concentric with the longitudinal axis of said lock ring, said lock ring being concentrically mounted with respect to said body and being both axially and rotatably movable relative thereto, said body having adjacent said ring an external annular channel concentric with the longitudinal axis of said body and upper and lower annular shoulders respectively defining the marginal edges of said channel, said lower shoulder being enlarged and having a portion thereof disposed beneath said ring for engagement thereby to force said chuck assembly from said spindle when the ring is rotated in one direction, said upper shoulder having a downwardly and outwardly facing arcuate surface defining an annular bearing race, said ring adjacent the lower edge of said annular channel having an upwardly and inwardly facing arcuate surface defining an annular bearing race, and a plurality of ball bearings of substantially equal diameter disposed between said races to force said chuck assembly onto said spindle and lock the same thereon when said ring is rotated in a direction opposite the aforesaid one direction, the respective distances between said channel and the race equipped end portion of said ring and between said annular recess and said upper shoulder being less than the diameter of said ball bearings to prevent escapement thereof from between said races.

2. In a chuck assembly for use with a spindle having an elongated, tapered end portion of reduced cross section and having also external threads adjacent thereto, a chuck body having a tapered opening for removably seating such end portion therein, a lock ring having an inwardly threaded section for engaging the threads of such spindle and having adjacent said inwardly threaded section an internal annular recess concentric with the longitudinal axis of said lock ring, said lock ring being concentrically mounted with respect to said body and being both axially and rotatably movable relative thereto, said body having adjacent said ring an external annular channel concentric with the longitudinal axis of said body and an upper and lower annular shoulder respectively defining the marginal edges of said channel, said lower shoulder being enlarged and having a portion thereof disposed beneath said ring for engagement thereby to force said chuck assembly from such spindle when the ring is rotated in one direction, said upper shoulder having a downwardly and outwardly facing arcuate surface defining an annular bearing race, said ring adjacent the lower edge of said annular channel having an upwardly and inwardly facing arcuate surface defining an annular bearing race, and a plurality of ball bearings of substantially equal diameter disposed between said races for forcing said chuck assembly onto such spindle and for locking the same thereon when said ring is rotated in a direction opposite the aforesaid one direction with the threads thereof engaging the threads of such spindle, the respective distances between said channel and the race equipped end portions of said ring and between said annular recess and said upper shoulder being less than the diameter of said ball bearings to prevent escapement thereof from between said races.

3. In a chuck assembly for use with a spindle having an elongated, tapered end portion of reduced cross section and having also external threads adjacent thereto, a chuck body having a tapered opening for removably seating such end portion therein, a lock ring having an inwardly threaded section for engaging the threads of such spindle and having adjacent said inwardly threaded section an internal annular recess concentric with the longitudinal axis of said lock ring, said lock ring being concentrically mounted with respect to said body and being both axially and rotatably movable relative thereto, said body having adjacent said ring an external annular channel concentric with the longitudinal axis of said body and an upper and lower annular shoulder respectively defining the marginal edges of said channel, said lower shoulder being enlarged and having a portion thereof disposed beneath said ring for engagement thereby to force said chuck assembly from such spindle when the ring is rotated in one direction, said upper shoulder having a downwardly and outwardly facing arcuate surface defining an annular bearing race, said ring adjacent the lower edge of said annular channel having an upwardly and inwardly facing arcuate surface defining an annular bearing race, and a plurality of ball bearings of substantially equal diameter disposed between said races for forcing said chuck assembly onto such spindle and for locking the same thereon when said ring is rotated in a direction opposite the aforesaid one direction with the threads thereof engaging the threads of such spindle, the respective distances between said channel and the race equipped end portions of said ring and between said annular recess and said upper shoulder being less than the diameter of said ball bearings to prevent escapement thereof from between said races, said ring being provided with a transverse opening therethrough communicating with said annular recess to provide a means for inserting said ball bearings into position between said races, and in which plug means are provided for closing said opening.

4. In a chuck assembly for use with a spindle having an end portion of reduced cross section and having also external threads adjacent thereto, a chuck body having an opening for removably seating said end portion therein, a lock ring having an inwardly threaded section for releasably engaging the threads of such spindle, said lock ring being concentrically mounted with respect to said body and being both axially and rotatably movable relative thereto, said body having adjacent said ring an external annular channel concentric with the longitudinal axis of said body and an upper and lower annular shoulder respectively defining the marginal edges of said channel, said lower shoulder being enlarged and having a portion thereof disposed beneath said ring for engagement thereby to force said chuck assembly from such spindle when the ring is rotated in one direction, said upper shoulder having a downwardly and outwardly facing arcuate surface defining an annular bearing race, said ring adjacent the lower end thereof having an upwardly and inwardly facing arcuate surface defining an annular bearing race, and a plurality of ball bearings of substantially equal diameter disposed between said races for forcing said chuck assembly onto such spindle and for locking the same thereon when said ring is rotated in a direction opposite the aforesaid one direction with the threads thereof in engagement with the threads of such spindle, the respective distances between said channel and the race-equipped end portion of said ring and between said upper shoulder and the upper part of said annular bearing race being less than the diameter of said ball bearings to prevent escapement thereof from between said races.

References Cited in the file of this patent

UNITED STATES PATENTS

| | | |
|---|---|---|
| 441,071 | Muir | Nov. 18, 1890 |
| 479,406 | Dickerson et al. | July 26, 1892 |
| 851,287 | Haun | Apr. 23, 1907 |
| 1,088,847 | Sutton | Mar. 3, 1914 |
| 1,188,363 | Schade | June 20, 1916 |
| 1,233,175 | Brewster | July 10, 1917 |
| 1,618,851 | Thunberg et al. | Feb. 22, 1927 |
| 1,651,087 | Ellrich | Nov. 29, 1927 |
| 2,058,062 | Cowles | Oct. 20, 1936 |
| 2,069,377 | Matthiessen | Feb. 2, 1937 |
| 2,258,377 | Collins | Oct. 7, 1941 |